United States Patent [19]

Shaw

[11] Patent Number: 5,021,789
[45] Date of Patent: Jun. 4, 1991

[54] REAL-TIME HIGH RESOLUTION AUTOFOCUS SYSTEM IN DIGITAL RADAR SIGNAL PROCESSORS

[75] Inventor: Wei H. Shaw, Los Angeles, Calif.

[73] Assignee: The United States of America as represented by the Secretary of the Air Force, Washington, D.C.

[21] Appl. No.: 551,813

[22] Filed: Jul. 2, 1990

[51] Int. Cl.$^5$ ............................................. G01S 13/90
[52] U.S. Cl. ..................................................... 342/25
[58] Field of Search ........................................ 342/25

[56] References Cited

U.S. PATENT DOCUMENTS

| | | | |
|---|---|---|---|
| H741 | 2/1990 | Powell et al. | 342/25 |
| 4,219,811 | 8/1980 | Herman et al. | 342/25 |
| 4,227,194 | 10/1980 | Herman et al. | 342/25 |
| 4,246,580 | 1/1981 | Caputi, Jr. | 342/25 |
| 4,564,839 | 1/1986 | Powell | 342/25 |
| 4,594,593 | 6/1986 | Nohmi | 342/25 |
| 4,724,418 | 2/1988 | Weindling | 342/25 |
| 4,771,287 | 9/1988 | Mims | 342/25 |
| 4,924,229 | 5/1990 | Eichel et al. | 342/25 |

Primary Examiner—Gilberto Barrón, Jr.
Attorney, Agent, or Firm—Bernard E. Franz; Donald J. Singer

[57] ABSTRACT

This autofocus is a system for improving the image quality of an airborne Synthetic Aperture Radar (SAR), that is mechanized in the high-speed digital signal processors with some control capability from the operating console to perform on-line focusing, to provide a unique and superior focusing technique. It includes (a) selecting the range bins which contain the strongest signals; (b) forming the subapertures from the end pulses in the selected range bins and performing map correlations; (c) judging the quality of each map correlation by its associated discriminate and determining the best one; and (d) generating the correcting phasors based on the best correlation and correcting the radar data accordingly.

1 Claim, 1 Drawing Sheet

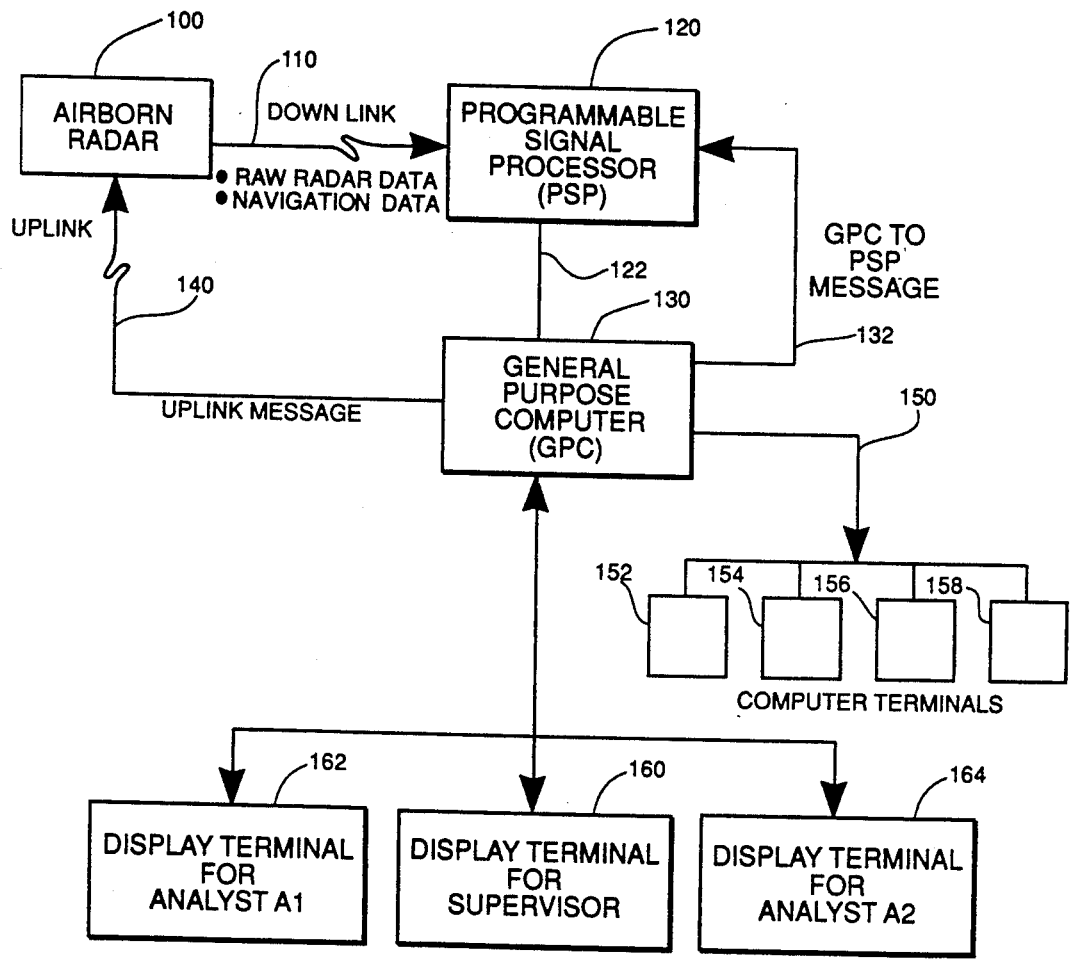

REAL-TIME HIGH RESOLUTION AUTOFOCUS SYSTEM IN DIGITAL RADAR SIGNAL PROCESSORS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a real-time high resolution autofocus system in digital radar signal processors.

Synthetic Aperture Radar (SAR) is believed to be one of the most intensively investigated areas in radar technology because of its tremendous applications ranging from military surveillance and weapon guidance to navigation and geological survey. Resolution and mapping range are considered to be two of the most important criteria in the performance evaluation of SAR images.

United States patents of interest include Herman et al U.S. Pat. No. 4,219,811, which discloses a synthetic array radar automatic focusing system which acts through derivation of focus error signals representative of required parameter changes in the processing of synthetic array data. The patented system obtains focus error signals by comparison of correlation data derived from a selected number of synthetic sub-arrays. Herman et al U.S. Pat. No. 4,227,194 discloses a synthetic array processor which achieves continuous real-time synthetic array mapping in the form of line-by-line imagery. The device of this patent is adaptable to all-range focusing and operation at various pointing angles. A Synthetic Aperture Radar (SAR) focusing system is taught by Weindling in U.S. Pat. No. 4,724,418. The SAR of Weindling is described in conjunction with the production of a terrain map. Caputi, Jr. U.S. Pat. No. 4,246,580 is concerned with a processor for correcting data from a bistatic SAR to eliminate distortions and resolution limitations. Powell U.S. Pat. No. 4,564,839 describes a radar signal focusing technique for radar systems which are suitable for high resolution applications such as ground-mapping and air reconnaissance.

An autofocus scheme using an elegant transformation technique for cross correlation was invented by a group of Hughes scientists lead by Dr. Morris Swiger. A pending patent application Ser. No. 05/864,293 filed Dec. 27, 1977 is of interest. This autofocus scheme was demonstrated successfully in one of Hughes' radar programs. Elegant as it may be, however, because of its computational complexity and the lack of control flexibility, there was still need for a scheme better suited in real-time applications. Furthermore, given extra array time which may have resulted from any system adjustment or software modification, there was need for a technique which could perform extra correlations to improve the performance (e.g. reliability), to fully utilize the extra array time and not to waste the extra computing power.

SUMMARY OF THE INVENTION

An objective of the invention is to provide a system for improving the image quality of an airborne Synthetic Aperture Radar (SAR).

This invention is directed to a system which involves high-speed digital processing to provide a unique and superior focusing technique. It includes (a) selecting the range bins which contain the strongest signals; (b) forming the subapertures from the end pulses in the selected range bins and performing map correlations; (c) judging the quality of each map correlation by its associated discriminate and determining the best one; and (d) generating the correcting phasors based on the best correlation and correcting the radar data accordingly.

The purpose of this invention is to improve the image quality of airborne SAR systems through a new focusing technique which is unique and superior in the following specific areas:

(a) Efficiency - by considering only the range bins with the highest signal-to-noise ratios versus greater numbers considered in alternative methods;

(b) Sensitivity - by forming the subapertures from the two ends of the coherent pulse train to detect even subtle phase drifts without performing large size FFTs;

(c) Simplicity - by measuring map correlation with direct convolutions rather than transformation to reduce both the amount of computation and the degree of software complexity;

(d) Reliability - by performing multi-correlation to the full extent of the given array time followed by its unique selecting process; and (e) Flexibility - by giving the radar operator interactive control of the key processing parameters to maximize the performance of this system.

The radar according to the invention costs very little to implement and can enhance an imaging radar with higher resolutions and greater ranges beyond the capability of its navigational platforms.

BRIEF DESCRIPTION OF THE DRAWING

The drawing is a block diagram showing a Synthetic Aperture Radar (SAR) system having an airborne radar.

DETAILED DESCRIPTION

0. INTRODUCTION

This autofocus is a system that is mechanized in the high-speed digital radar signal processors with some control capability from the operating console to perform on line focusing automatically. By automatically, it means that the system has the intelligence to process the input signal differently for different kind of signals to produce sharp images always. Therefore, this autofocusing system enhances a real-time imaging radar with higher resolutions and greater ranges beyond the capability of its navigational platforms. Let $I_1$ be a positive integer and let $$\{P(t,n): t=1,2,\ldots,2^{I_1}; n=1,2,\ldots,N\} \quad (0.0)$$

be a sequence of $2^{I_1}$ coherent radar pulses of I/Q data over N range bins.

Equation (0.0) defines the raw radar data a ground mapping radar system has collected, where t is the time variable indicating the pulse sampled in time and n is the range bin variable indicating the pulse collected at the nth range bin.

This application discloses a new technology of removing the quadratic phase drift of (0.0) which is inherited from the navigational platforms and is the dominating source of azimuth smearing in the digital signal processing of SAR images. This system is particularly useful in real-time applications because of its natural simplicity and also because its key parameters J, K, L, M, and R are considered as radar parameters and can be individually adjusted by radar operators during imaging to minimize the processing time.

The drawing depicts a typical setup of an airborne radar 100 equipped with this autofocus system. The airborne radar 100 transmits raw radar data and navigation data via a down link radio transmission channel 110 to a Programmable Signal Processor (PSP) 120. A general purpose computer (GPC) computer 130 receives data from the PSP 120 via a line 122, and GPC-to-PSP (e.g. a VAX) messages are sent from the GPC 130 to the PSP 120 via a line 132. Up link messages are transmitted from the general purpose computer 130 to the airborne radar 100 via an up link radio transmission channel 140. All of the autofocus processing and intelligence reside in a memory of the programmable signal processor 120 with the radar parameters supplied by the general purpose computer 130 through the GPC-to-PSP message line 132 which is executed once every array. There are three radar operators - one supervisor and two analysts (A1, A2), each of whom has his own high resolution display terminal (e.g. Ramtek) with a display terminal 160 for the supervisor, and display terminals 162 and 164 for the two analysts. (RAMTEK is a high resolution (2000 by 2000 line) cathode ray tube display terminal that was used in an embodiment of the invention, but any display terminal of high resolution quality would be equivalent).

The system performance is constantly monitored and with key parameters displayed during imaging on four computer terminals (e.g. VT-100s) 152, 154, 156 and 158, which are coupled to the general purpose computer (e.g. VAX) 130 via a line 150. If the performance is not satisfactory, the supervisor can input new values of radar parameters, e.g. J, K, L, M, R, and control flags, into the VAX computer from a keyboard of his Ramtek 160. The new values will be accepted by the VAX computer if they are legitimate and will be sent to the PSP 120 during the next time slot for processing.

1. RANGE BIN SELECTION

We shall select a subset S of range bins to perform our autofocus scheme. The Subset S is selected based on the J largest magnitudes of all N range bin returns described by equations (1.2a) and (1.2b). The process has the following advantages:
  (i) The autofocus will be performed only on the range bins where the signal-to-noise ratios are the highest to get better results.
  (ii) The amount of calculations will be greatly saved for J much smaller than N.
  (iii) In general, a larger J always provides a better focused array or at least a higher probability of a better focused array. The strength of this invention is at its real time applications. This parameter J is under operator control. Depending on the computing capability of the specific system using this scheme, the operator can adjust this parameter along with others (see the parameters K, L, and R defined in later section) in real-time to maximize the performance.

Pick an integer $t_0$, $0 < t_0 \leq 2^{I_1}$, and compute $$MAG(n) = \sum_{t=1}^{t_0} |P(t, n)| \quad (1.1)$$

for $n = 1, 2, \ldots, N$. Let J, $0 < J \leq N$, be a fixed integer. Then, a set $$S = \{RB(1), RB(2), \ldots, RB(J)\} \quad (1.2a)$$

of J distinct range bin numbers can be selected such that $$MAG(RB(1)) \geq MAG(RB(2)) \geq \ldots$$
$$\geq MAG(RB(J)) \geq Max\{MAG(n): n \quad S\} \quad (1.2b)$$

The autofocus subapertures will be formed on these range bins in S where the signal to noise ratios are high.

2. FORMULATION OF SUBAPERTURES

The idea of this autofocus scheme is to perform map correlations on two subapertures. One subaperture is formed by the first $2^{I_3}$ pulses and the other is formed by the last $2^{I_3}$ pulses of raw data (0.0). They are formed by taking uniformly weighted $2^{I_2}$-point FFTs separately. If we select $I_2 > I_3$, then $2^{I_2} - 2^{I_3}$ 0's will be filled before taking the fast Fourier transforms. Then for each range bin s selected in S, the left aperture LA and the right aperture RA are formed by summing the neighboring range bin filter magnitudes within R range bins (equations 2.3 (a-d)). For example, if range bin 5 is selected and R = 1, then for any filter m of the $2^{I_2}$ filters formed, the left aperture of range bin 5 and filter m, LA(5,m), is computed by the sum of the magnitude of range bins 4–6 of filter m. We shall make several comments:
  (i) The choice of R value other than 0 is mainly for the possible drift of range walk. Large R should be avoided.
  (ii) The parameter R is under operator control. A proper choice of R is either 0 or 1 with 0 as default value.
  (iii) The elements of a subaperture are magnitudes. All phase information is lost from here on.
  (iv) The idea of subaperture is to select two subapertures that are widely separated in time. The wider they are separate, the more subtle drift this scheme can detect.
  (v) The parameters $I_1$, $I_2$, $I_3$, and R, are under operator control, to minimize the amount of computations as long as they satisfy equations 2.1–2.2.

Consider the radar data (0.0) and select integers $I_2$ and $I_3$ such that $$I_1 \geq I_2 \geq I_3 > 0 \quad (2.1a)$$

and $$I_1 > I_3 \quad (2.1b)$$

where $I_1$, $I_2$, and $I_3$ are the sizes of full aperture, subaperture, and data respectively.

Subapertures are formed by performing uniformly weighted $2^{I_2}$-point FFT's with $2^{I_3}$ data from (0.0) and the rest filled with $2^{I_2} - 2^{I_3}$ consecutive 0's.

Let the FFT results be denoted by the sequence $$\{F(\alpha, n, m): m = 0, 1, 2, \ldots, 2^{I_2} - 1\} \quad (2.2)$$

where $a = 1$ input data are the first $2^{J3}$ pulses of (0.0)
2 input data are the last $2^{J3}$ pulses of (0.0);
$n$ = range bin number, $1 \geq n \geq N$; and
$m$ = filter number which is a modulo $2^{J2}$ integer with D.C. filter indexed by 0.

Then, the left aperture LA and the right aperture RA are denoted and defined by $$LA(s) = \{LA(s, m): m = 0, 1, 2, \ldots, 2^{J2} - 1\} \quad (2.3a)$$

$$= \left\{ \sum_{|n-s| \leq R} |F(1, n, m)|: m = 0, 1, 2, \ldots, 2^{J2} - 1 \right\} \quad (2.3b)$$

$$RA(s) = \{RA(s, m): m = 0, 1, 2, \ldots, 2^{J2} - 1\} \quad (2.3c)$$

$$= \left\{ \sum_{|n-s| \leq R} |F(2, n, m)|: m = 0, 1, 2, \ldots, 2^{J2} - 1 \right\} \quad (2.3d)$$

for every $s \epsilon S$.

3. MAP CORRELATION

This is the step that the two subapertures LA(s) and RA(s) are correlated to find the drift between them. Because correlations can be computational intensive, we can wisely select the parameters K and L such that the computations for the $2K+1$ correlations, COR(s,K), defined by equation (3.1) can greatly reduce the loading of the computer in real time applications. For each selected range bin s in S, the map drift, DRF(s), can be estimated by equations 3.2–3.4. The idea behind these equations is if the largest correlation happens at $k_0$ then the map drifts approximately $k_0$ filters between these two subapertures. However, most likely, the drift in not an integer. Here, we use a polynomial of degree two and three known values—the maximum correlation and its two neighbors to approximate the point where the true maximum is attained. The result is the drift estimated by equations 3.4 (a–b). Therefore, by using a second degree polynomial approximation, we can estimate our map drift to a fraction of a filter. We shall make a few comments here:

(i) By the time the system is built, the system engineers are pretty much familiar with the system performance and the ranges of parameters K and L can be wisely determined to minimize the amount of calculations. These ranges can be displayed on the operator console as quick reference.

(ii) The value of K is selected such that it is large enough to cover the potential drift of the navigational platform.

(iii) The value of L is selected such that the indices in equation (3.1) are those representing the mainlobe where all filters have sufficient power, i.e. the magnitudes have good signal-to-noise ratios.

Let K and L be fixed positive integers selected for this application. For each $s \epsilon S$, $2K+1$ convolutions are defined by $$CNV(s, k) = \sum_{m=0}^{L-1} LA(s, m - k) \cdot RA(s, m) + \quad (3.1)$$

$$\sum_{m=2^{J2}-L}^{2^{J2}-1} LA(s, m - k) \cdot RA(s, m)$$

for all integers k such that $|k| \leq K$.
Let $k_0$ be the smallest integer k such that $$CNV(s, k_0) = \text{Max}\{CNV(s,k): |k| \leq K\} \quad (3.2)$$

and define the notation $$CRV(s) = 2 \cdot CNV(s, k_0) - CNV(s, k_0 - 1) - CNV(s, k_0 + 1) \quad (3.3)$$

for each $s \epsilon S$ such that $|k_0| < K$. Then the map drift DRF(s) is defined by $$DRF(s) = k_0 \quad (3.4a)$$
if $|k_0| = K$ or $CRV(s) = 0$ $$= k_0 + \frac{CNV(s, k_0 + 1) - CNV(s, k_0 - 1)}{2 \cdot CRV(s)} \quad (3.4b)$$
otherwise for every $s \epsilon S$.

4. DISCRIMINANT OF A MAP CORRELATION

If we have a rather slow processor such that we can select only one range bin to perform this autofocus scheme, i.e. $J = 1$ and S has only one element, then this section is not necessary. The drift measured at this range bin will be used in section 6 to correct the phase pulse by pulse and focus our map. However, if the system is equipped with a powerful digital signal processor such as Hughes Programmable Signal Processor, we can select more range bins ($J > 1$) to perform map correlations to get better results. If more than one range bin is selected, then more than one drift is estimated. The question is then which drift estimates shall we use to focus our data. This section provides us with two kinds of discriminants—which serve as means to measure the figure of merit of a map correlation.

The first discriminant is based on the slope of the correlations. We use a polynomial of degree 2 as a model to approximate the maximal drift. If the correlation maximum is estimated to be $f_{max}$ which is attained at $x_{max}$, let $f_{min}$ be the smaller one of the two neighborhood correlation values around the maximum one, i.e. the correlation value at $k_0$. Then the slope m is given by $$m = \frac{f_{max} - f_{min}}{1 + |x_{max}|}$$

which is equations 4.1 (a–b) expressed in terms of correlation values.

The second discriminant is based on the power ratio of the maximum correlation value and the average filter power. The average filter power is computed by eliminating those filters with the power less than the average power. We can perform this elimination once to get the one-pass average power AVG(s,1) defined by equations 4.2–4.4 or we can perform this elimination of filters twice to get the two-pass average power AVG(s,2) defined by equations 4.5–4.6.

We shall make the following remarks:
(i) The idea behind the slope method is that variation of the correlation values is pretty much random (and relatively small) and is maximized when two maps are perfectly correlated. The one with higher slope indicates a better correlation measure.

(ii) The idea behind the power ratio method is that larger correlation value should imply better measurement if they are normalized by the filter power.

(iii) The selection of the slope method or the power ratio method and the selection of 1-pass or 2-pass average in the power ratio method are under operator control and can be adjusted in real time.

For each $s \in S$, the quality of the map correlation on $s$ is measured by its discriminant DSC(s) which can be defined by either of the following two methods.

a. Slope Method:

$$DSC(s) = 0 \quad \text{if } |k_0| = K \text{ or } CRV(s) = 0 \quad (4.1a)$$

$$= \frac{\frac{[CNV(s, k_0 + 1) - CNV(s, k_0 - 1)]^2}{8 \cdot CRV(s)} + CNV(s, k_0) - \text{Min}\{CNV(s, k_0 + 1), CNV(s, k_0 - 1)\}}{1 + \left|\frac{CNV(s, k_0 + 1) - CNV(s, k_0 - 1)}{2 \cdot CRV(s)}\right|} \quad (4.1b)$$

otherwise for each $s \in S$.

b. Power Ratio Method:

$$AVG(s, 0) = \frac{1}{2 \cdot K + 1} \cdot \sum_{k=-K}^{K} CNV(s, k) \quad (4.2)$$

be the average power of all convolutions and define $$K(s,1) = \{k: CNV(s,k) \leq AVG(s,0)\} \quad (4.3)$$

which is always nonempty. Then the 1-pass background power is computed and denoted by $$AVG(s, 1) = \frac{1}{NK(s, 1)} \cdot \sum_{k \in K(s,1)} CNV(s, k) \quad (4.4a)$$

where
$NK(s, 1)$ = the number of elements in $K(s, 1) > 0$. (4.4b)

Similarly, define $$K(s,2) = \{k: CNV(s,k) \leq AVG(s,1)\} \quad (4.5)$$

which is always nonempty. Then, the 2-pass background power is computed and denoted by $$AVG(s, 2) = \frac{1}{NK(s, 2)} \cdot \sum_{k \in K(s,2)} CNV(s, k) \quad (4.6a)$$

where
$NK(s, 2)$ = the number of elements in $K(s, 2) > 0$. (4.6b)

Finally, the discriminant of the map correlation on $s$ is defined by $$DSC(s) = \frac{CNV(s, k_0)}{AVG(s)} \quad (4.7a)$$

$$= \frac{\frac{[CNV(s, k_0 + 1) - CNV(s, k_0 - 1)]^2}{8 \cdot CRV(s)} + CNV(s, k_0)}{AVG(s)} \quad (4.7b)$$

otherwise
where
$AVG(s) = AVG(s, 1)$ or $AVG(s, 2)$ (4.7c)

for every $s \in S$.

Note: The selection of the slope method or the power ratio method and the selection of AVG(s,1) or AVG(s,2) in (4.7c) are under operator control.

5. CORRELATION SELECTION AND COMPUTATION

With the discriminants developed in section 5, we are able to best estimate one and only one drift value which will be used to focus the full aperture (0,0). Here, the final map drift DFT can be determined based on two different principles.

The first principle is the maximum discriminant. We have discussed in section 4 that the two discriminants are invented to measure the merit of our map correlations. The higher the discriminant value, the higher the figure of merit is given to the correlation. It is natural that the drift measured at range bin whose discriminant has the maximum value will be used. The selection is defined by equations 5.1 (a-b).

The second principle is least-square approximation. Here, the final drift DFT is not determined by a single best selected range bin but the best M range bins whose discriminants are the largest among the J candidates. And the final drift DFT is computed by the familiar least-square method given by equations 5.2 (a-c).

We have the following remarks:
(i) The selection of maximum discriminant or least-square approximation is controlled by the radar operator with a flag.
(ii) The parameter M is also controlled by the radar operator. It is recommended that $M < J/2$.

The map drift DRF can be determined by either of the following two methods controlled by the radar operator with a flag.

a. Maximum Discriminant:
Let $s_1$ be the smallest integer in S such that $$DSC(s_1) = \text{Max}\{DSC(s): s \in S\} \quad (5.1a)$$

where S is defined by (1.2) and DSC(s) is computed by (4.1) or (4.7). Then the range bin $s_1$ is uniquely determined for final autofocus dechirping. The map drift DRF is defined by $$DRF = DRF(s_1) \quad (5.1b)$$

where DRF(s) is given by (3.4).

b. Least-Square Approximation:
Let $$S = \{s_1, s_2, \ldots, s_J\} \quad (5.2a)$$

be ordered such that $$DSC(s_1) \geq DSC(s_2) \geq \ldots \geq DSC(s_J) \quad (5.2b)$$

where DSC(s) is computed by either (4.1) or (4.7). Select an integer M such that $2 \leq M \leq J$. Then the map drift DRF is computed by $$DRF = \frac{\sum_{i=1}^{M} DSC(s_i) \cdot DRF(s_i)}{\sum_{i=1}^{M} DSC(s_i)} \quad (5.2c)$$

where DRF(s) is given by (3.4).

6. QUADRATIC PHASE DRIFT AND DECHIRPING OF RADAR DATA

In this invention, we assume that the phase drift is quadratic. Although higher order drifts do exist, the quadratic phase drift is the dominant source which smears our image. If the full aperture, the FFT size, and the subaperture are $2^{I_1}$ pulses, $2^{I_2}$, and $2^{I_3}$ pulses respectively, then the quadratic phase drift can be easily estimated by equation 6.1. It follows that a sequence of correcting phasors can be computed by equation 6.2. Applying 6.2 to the raw data (0,0), we obtain a focused array given by equation 6.3.

The quadratic phase drift a of (0.0) is approximated by the equation $$a \approx \frac{DRF}{2^{I_2+I_3+1} \cdot (2^{I_1-I_3} - 1)} \quad (6.1)$$

Where a is in the unit of cycle/(PRI)$^2$, and DRF is defined by either (5.1) or (5.2).

It follows easily that the sequence of correcting phasers $$\{e^{-i \cdot a \cdot (t - 2^{I_1} - 1)^2}; t = 1, 2, \ldots, 2^{I_1}\} \quad (6.2)$$

can be computed and applied to the input data (0.0). The dechirped radar data form the sequence $$\{P(t,n) \cdot e^{-i \cdot a \cdot (t - 2^{I_1} - 1)^2}; t = 1, 2, \ldots, 2^{I_1}; n = 1, 2, \ldots, N\} \quad (6.3)$$

which is the focused array of this system.

7. FINAL REMARKS a. The choice of R values other than 0 is mainly for the possible drift of range walk. Large R values may cause the subapertures LA and RA to be very complicated to correlate. A proper choice of R is either 0 or 1.

b. K is selected such that it is large enough to cover the potential drift of the navigational platform.

c. L is selected such that the indices m in (3.1) are those representing the mainlobe clutter where filters may have sufficient energy.

d. The selection of power ratio method and especially the use of 2-pass background power may be unwise when K is small.

e. It may be preferable that M is selected such that $M \leq J/2$.

f. It is easy to see that the map correlation, i.e. the computation of (3.1) is the single most time-consuming item of the entire process. The idea is behind this scheme, especially in the case of real-time applications, is to make wise selections of K, L, and R to eliminate unnecessary calculations so that J can be maximized within the given array time. A larger J always provides a better focused array or at least a higher probability of a better focused array.

TEST RESULTS

This autofocus system has been mechanized on the Hughes Pave Mover radar and was partially tested by mapping a field placed with corner reflectors. The test was conducted with the following parameters: J=1, K=16, L=96, and R=1. The recorded map drift DRF was 5 (truncated to integer). When the pixel values were examined, the adjacent pixels were measured 8 dB and 14 dB down from the center (i.e. the brightest) one and the one's which are 2 pixels away from the center one were measured at least 25 dB down. This indicated that the point target was focused well within one half of a resolution cell according to the cosine weighting function used. However, the performance evaluation of the full scope of this autofocus scheme (e.g. the focusing probability as J becomes large) was not finished due to funding.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. An autofocus method for use in a system having an airborne synthetic aperture radar, the autofocus process being mechanized in high-speed digital signal processors with control capability from an operating console to change selected processing parameters to perform on-line focusing;

wherein said autofocus method comprises the steps of (a) selecting range bins which contain the strongest signals, from raw data $$\{P(t,n): t = 1, 2, \ldots, 2^{I_1}; n = 1, 2, \ldots, N\}$$

wherein $I_1$ designates the size of a full aperture and is a positive integer which is one of said selected processing parameters, the number of range bins (J) selected being one of said selected processing parameters;

(b) forming two subapertures designated left (LA) and right (RA) from the first $2^{I_3}$ pulses and the last $2^{I_3}$ pulses of raw data in the selected range bins, the subapertures being formed by taking uniformly weighted $2^{I_2}$-point fast Fourier transforms separately, $2^{I_2}-2^{I_3}$ 0's being filled before taking the fast Fourier transforms, $I_2$ and $I_3$ being among said selected processing parameters, with $I_1 \geq I_2 \geq I_3 > 0$ and $I_1 > I_3$, the left aperture and the right aperture each being formed by summing neighboring range bin filter magnitudes within a distance of R range bins, R being one of said selected processing parameters, the elements of the subapertures being magnitudes, with all phase information lost for further processing;

(c) performing correlations of the map formed by the left subaperture and the map formed by the right subaperture to find the drift between them, using not more than a second degree polynomial for only quadratic drift;

(d) measuring the quality of each map correlation by an associated discriminate, selecting from a first discriminant based on the slope of the correlations, and a second discriminant base on a power ratio of maximum correlation value and average filter power, the average filter power being computed by eliminating those filters with the power less than the average power, the elimination being performed either once to get a one-pass average power AVG(s,1), or twice to get a two-pass average power AVG(s,2), the selection of the first discriminant or the second discriminant and the selection of one-pass or two-pass average being under operator control and adjustable in real time;

(e) determining the final drift value using a best estimation of the discriminant from step (d), using either a first method or a second method under the control of the operator with a flag, the first method being selection of a maximum discriminant, and the second method being a least-square approximation;

(f) generating estimated correcting phasors based on the best correlation and correcting the radar data according to the estimated correcting phasors.

* * * * *

UNITED STATES PATENT AND TRADEMARK OFFICE
CERTIFICATE OF CORRECTION

PATENT NO. : 5,021,789
DATED : June 4, 1991
INVENTOR(S) : Wei H. Shaw

It is certified that error appears in the above-identified patent and that said Letters Patent is hereby corrected as shown below:

Col 4, line 13, -- $\notin$ -- should precede "s"
Col 5, line 1, -- $\rightarrow$ -- should follow "$\alpha=1$".
Col 5, line 2, -- $\rightarrow$ -- should follow "2".
Col 5, line 3, both occurrences of "$\geq$" should read -- $\leq$ --.

Signed and Sealed this

Twenty-sixth Day of January, 1993

Attest:

STEPHEN G. KUNIN

*Attesting Officer*    Acting Commissioner of Patents and Trademarks